United States Patent [19]
Ochi

[11] Patent Number: 5,714,021
[45] Date of Patent: Feb. 3, 1998

[54] PNEUMATIC TIRES

[75] Inventor: Naoya Ochi, Kodaira, Japan

[73] Assignee: Bridgestone Corporation, Tokyo, Japan

[21] Appl. No.: 536,431

[22] Filed: Sep. 29, 1995

[30] Foreign Application Priority Data

Oct. 6, 1994 [JP] Japan .................................. 6-242941

[51] Int. Cl.$^6$ .............................................. B60C 115/00
[52] U.S. Cl. .................................. 152/209 R; 152/209 D
[58] Field of Search ........................... 152/209 R, 209 D; D12/149, 151

[56] References Cited

U.S. PATENT DOCUMENTS

| D. 360,864 | 8/1995 | Munster et al. | D12/151 |
|---|---|---|---|
| 5,131,443 | 7/1992 | Kuhr et al. | 152/209 R |
| 5,234,042 | 8/1993 | Kuhr et al. | 152/209 R |
| 5,375,639 | 12/1994 | Suzuki et al. | 152/209 R |
| 5,421,391 | 6/1995 | Himuro | 152/209 R |
| 5,423,364 | 6/1995 | Himuro | 152/209 R |
| 5,609,699 | 3/1997 | Himuro | 152/209 D |

FOREIGN PATENT DOCUMENTS

| 0 565 270 A1 | 10/1993 | European Pat. Off. |  |
|---|---|---|---|
| 0 590 526 A1 | 4/1994 | European Pat. Off. |  |
| 705718 | 4/1996 | European Pat. Off. | 152/209 R |
| 2 655 920 | 6/1991 | France |  |
| 319025 | 12/1993 | Japan | 152/209 D |
| 2239845 | 7/1991 | United Kingdom | 152/209 D |

Primary Examiner—Steven D. Maki
Attorney, Agent, or Firm—Sughrue, Mion, Zinn, Macpeak & Seas, PLLC

[57] ABSTRACT

A pneumatic tire having improved steering stability and drainage property comprises a tread divided into two tread parts at a center of a tread pattern, and a plurality of main grooves arranged in each of these tread parts, each of which main grooves being comprised of a steep slope segment, a bending segment and a gentle slope segment. The main grooves comprises a group of first main grooves and a group of second main grooves, in which the steep slope segment and gentle slope segment of the second main groove are substantially in parallel with those of the first main groove. Further, a zone of a land portion sandwiched between the steep slope segments of these main grooves is fairly narrow in a land width as measured in a direction perpendicular to the first main groove as compared with a zone of the land portion sandwiched between the gentle slope segments of the main grooves, and a surface height of the zone of the land portion sandwiched between the steep slope segments is gradually decreased toward the pattern center.

9 Claims, 5 Drawing Sheets

1

PNEUMATIC TIRES

BACKGROUND OF THE INVENTION

1. Field of the Invention

This invention relates to a pneumatic tire having an improved drainage property without sacrificing steering stability.

2. Description of the Related Art

In order to obtain a sufficient drainage property in the pneumatic tire, a tire tread is divided into two tread parts at a tread pattern center and a plurality of main grooves slantly extending from the pattern center or the vicinity thereof toward an end of the tread so as to open to the tread end are arranged in each of these tread parts. Particularly, the tire having such a tread pattern is mounted onto a vehicle in such a manner that each of the main grooves gradually enters into a ground contact region from the end of the main groove located at or in the vicinity of the pattern center toward the tread end.

Furthermore, it is known that both the steering stability and drainage property of the tire can be balanced and satisfied by forming a portion of the main groove located at a central zone of the tread in form of a steep slope such that an inclination angle with respect to a circumferential direction of the tire is relatively small and a portion of the main groove located at a side end zone of the tread is in form of gentle slope such that the inclination angle is relatively large.

As a general countermeasure for improving the drainage property of a tire, it is usually attempted to increase a ratio of groove area to land area in the tread. Particularly, in the case of low-section profile tires, it is required to enhance the drainage property of the main groove at the central zone of the tread because a width of the tread is wider as compared with the usual tire. To achieve this end, it is known to make larger the ratio of groove area in a portion of the main groove located at the central zone of the tread.

However, when the ratio of groove area in the portion of the main groove located at the central zone of the tread is made larger, the rigidity of land portion existing in the central zone of the tread is lowered which degrades the steering stability. Additionally the balance in the ratio of groove area between the portion located at the central zone of the tread and the portion located at the side end zone of the tread in the main groove may be lost to degrade the drainage property of the tire.

SUMMARY OF THE INVENTION

It is, therefore, an object of the invention to provide a pneumatic tire satisfying both steering stability and drainage property by rationalizing the arrangement of the main groove and the shape of a zone of a land portion sandwiched between steep slope segments of the main grooves to effectively increase groove volume in the central zone of the tread while controlling the lowering of the rigidity in the land portion.

According to the invention, there is the provision of a pneumatic tire comprising a tread divided into two tread parts at a center of a tread pattern, and a plurality of main grooves arranged in each of these tread parts, each of which main grooves being comprised of a steep slope segment extending from a position of the pattern center or the vicinity thereof at a relatively small inclination angle with respect to a circumferential line of the tire, a bending segment extending from the steep slope segment at such a curvature that the inclination angle is gradually increased and a gentle slope segment extending from the bending segment so as to open at an end of the tread and having a relatively large inclination angle with respect to the circumferential line, and gradually entered into a ground contact region from the position of the pattern center or the vicinity thereof toward the end of the tread, the improvement wherein the main grooves comprises a group of first main grooves and a group of second main grooves, and the first and second main grooves are alternately arranged so as to first contact the first main groove with ground, and the steep slope segment and gentle slope segment of the second main groove are substantially in parallel with those of the first main groove, and a zone of a land portion sandwiched between the steep slope segments of these main grooves is fairly narrow in a land width as measured in a direction perpendicular to the first main groove as compared with a zone of the land portion sandwiched between the gentle slope segments of the main grooves, and a surface height of the zone of the land portion sandwiched between the steep slope segments is gradually decreased toward the pattern center.

Moreover, the reason why the steep slope segment and gentle slope segment of the second main groove are substantially in parallel with those of the first main groove is due to the fact that it is intended to include a case that the difference of the inclination angle between the steep slope segments and between the gentle slope segments is within a range of 0°–15° in addition to the case that the steep slope segments and the gentle slope segments of these main grooves are in parallel with each other.

In a preferred embodiment of the invention, the inclination angle of each of the first and second main grooves is within a range of 0°–40°, preferably 5°–30° in the steep slope segment, and within a range of 50°–90°, preferably 55°–90° in the gentle slope segment.

In another preferred embodiment of the invention, the land width of the zone of the land portion sandwiched between the steep slope segments of the first and second main grooves is 0.03–0.50 times of the land width of the zone of the land portion sandwiched between the gentle slope segments of these main grooves and within a range of 0.3–2.5 times the groove width of the first main groove.

In the other preferred embodiment of the invention, a circumferential length of the zone of the land portion sandwiched between the steep slope segments of the first and second main grooves and projected onto the circumferential line of the tire is within a range of 1–5 times a central distance between opening ends of the first and second main grooves at the tread end.

In the further preferred embodiment of the invention, the surface height of the zone of the land portion sandwiched between the steep slope segments of the first and second main grooves is substantially met at its most decreased position with a bottom of the first main groove.

In the still further preferred embodiment of the invention, the central distance between opening ends of the first and second main grooves is approximately equal to a central distance between opening ends of the first main groove and a preceding second main groove.

In the other preferred embodiment of the invention, the zone of the land portion sandwiched between the first main groove and the preceding second main groove is provided with a plurality of auxiliary grooves each communicating to these main grooves.

BRIEF DESCRIPTION OF THE DRAWINGS

The invention will be described with reference to the accompanying drawings, wherein.

DESCRIPTION OF THE PREFERRED EMBODIMENTS

Figure 1:
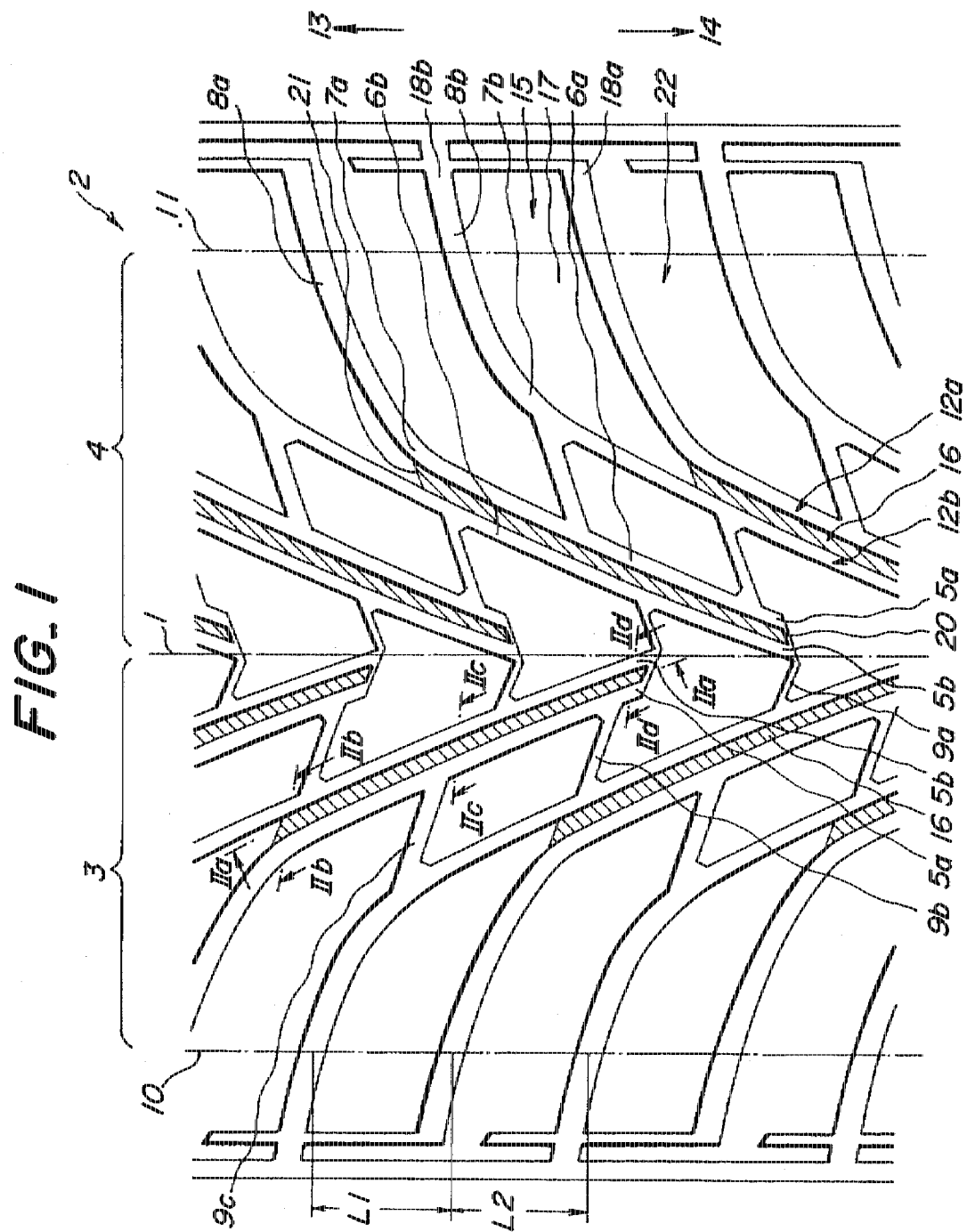
FIG. 1 is a diagrammatical view illustrating a part of a tread pattern in a typical example of the pneumatic tire according to the invention.
Figure 2A:
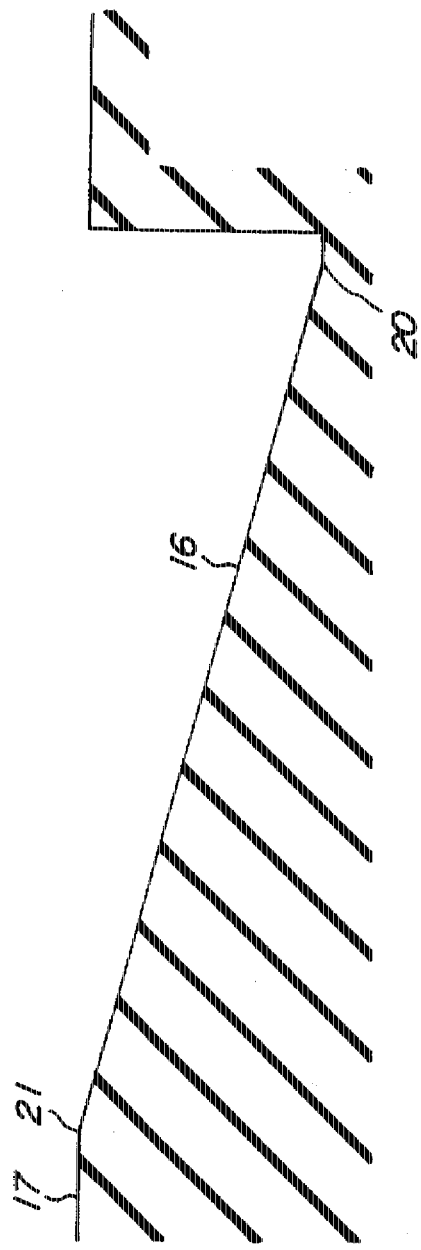
FIGS. 2a to 2d are sectional views taken along lines IIa—IIa, IIb—IIb, IIc—IIc and IId—IId of FIG. 1, respectively.
Figure 2D:
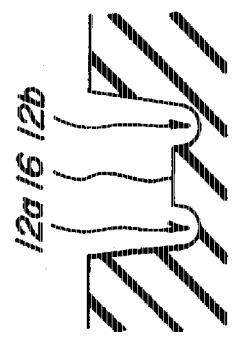
Figure 2C:
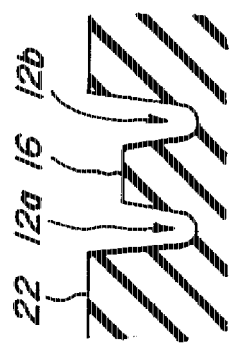
Figure 2B:
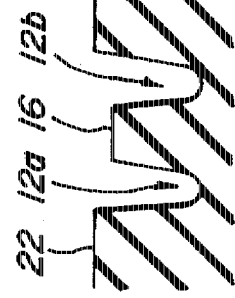

In FIG. 1 is shown a typical tread pattern of the pneumatic tire according to the invention, in which numeral 1 is a pattern center, numeral 2 a tread, numerals 3 and 4 portions of the tread, numeral 5 an end point of (first and second) main groove, numeral 6 a steep slope segment of the main groove, numeral 7 a bending segment of the main groove, numeral 8 a gentle slope segment of the main groove, numeral 9 an auxiliary groove, numerals 10 and 11 ends of the tread, numeral 12 a in groove (a) is attached to the first main groove and (b) is attached to the second main groove in the illustrated embodiment, numeral 13 a succeeding ground contact side, numeral 14 a preceding ground contact side, numeral 15 a land portion sandwiched between the first main groove and the second main groove located at the succeeding ground contact side, numeral 16 a zone of the land portion 15 sandwiched between the steep slope segments 6a, 6b, and numeral 16 a zone of the land portion 15 sandwiched between the gentle slope segments 8a, 8b.

In this tire, the tread 2 is divided into two tread portions 3 and 4 at the pattern center 1. In each of the tread portions are arranged a plurality of first and second main grooves 12a, 12b each being comprised of the steep slope segment 6a, 6b extending from the end point 5a, 5b located in the pattern center 1 or the vicinity thereof at a relatively small inclination angle, preferably an inclination angle of 0°–40° with respect to a circumferential line of the tire, the bending segment 7a, 7b extending from the steep slope segment 6a, 6b at such a curvature that the inclination angle is gradually increased and the gentle slope segment 8a, 8b extending from the bending segment 7a, 7b so as to open at the tread end 10 or 11 and having a relatively large inclination angle, preferably an inclination angle of 50°–90° with respect to the circumferential line.

Moreover, the reason why the inclination angle of the steep slope segment 6a, 6b in the main grooves 12a, 12b is restricted to a range of 0°–40° with respect to the circumferential line of the tire is due to the fact that a flow line of water running into the ground contact region of the tire is frequently within a range of 0°–40°. The reason why the inclination angle of the gentle slope segment 8a, 8b is restricted to a range of 50°–90° is due to the fact that the drainage efficiency sideward from the tire is enhanced and also the block rigidity is ensured within such an inclination angle range.

In this tire, a direction of mounting onto a vehicle is specified. That is, the tire is mounted onto the vehicle so that the main grooves 12a, 12b gradually enter into the ground contact region from the end point 5a, 5b toward the tread end 10 or 11.

The first and second main grooves 12a, 12b are alternately arranged to first contact the first main groove with the ground or the second main groove 12b is located at the succeeding ground contact side 13 to the first main groove 12a, in which the steep slope segment 6b and gentle slope segment 8b of the second main groove 12b are substantially in parallel with those 6a, 8a of the first main groove 12a.

Particularly, the invention is mainly characterized by rationalizing the shape of the zone 16 of the land portion 15 sandwiched between the steep slope segments 6a, 6b of the main grooves 12a, 12b, concretely width, length and height of the land zone 16. That is, it is preferable that the land width of the land zone 16 as measured in a direction perpendicular to the first main groove 12a is 0.03–0.50 times a land width of the land zone 17 sandwiched between the gentle slope segments 8a, 8b and is within a range of 0.3–2.5 times a groove width of the first main groove 12a. If the land width of the land zone 16 is too narrow, the rigidity of the land zone 16 is lowered to degrade the ear resistance, while if it is too wide, the rigidity of a land zone adjacent to the land zone sandwiched between the steep slope segments is lowered to adversely affect running performance and wear resistance. Therefore, the lowering of the wear resistance and running performance can be prevented by setting the land width of the land zone to the above range. Moreover, the land width of the land zone 17 sandwiched between the gentle slope segments 8a, 8b differs in accordance with the pitch length, but is preferably within a range of 15–40 mm in view of the maintenance of shoulder rigidity and the prevention of pattern noise.

Furthermore, it is favorable that the circumferential length projected onto the circumferential line of the tire in the land zone 16 sandwiched between the steep slope segments 6a, 6b is within a range of 1–5 times a central distance between tread opening ends 18a and 18b of the first and second main grooves 12a and 12b. If the circumferential length exceeds the above range, the actual ground contact area is decreased at the central region of the tread and also the rigidity of the land zone 16 becomes small to cause an uneven wear and the satisfactory steering stability is not obtained. If it is less than the above range, the improvement of the drainage property is not obtained.

And the land zone 16 is chamfered in such a manner that the surface height of the land zone 16 sandwiched between the steep slope segments 6a, 6b is gradually decreased toward the pattern center 1. In this case, it is preferable that the most decreased position in the surface height of the land zone 16 is substantially flush with the bottom of the first main groove for ensuring the groove volume in the vicinity of the central region of the tread. The land zone 16 of the tire shown in FIG. 1 is sectionally shown in FIGS. 2a to 2d taken along lines IIa—IIa, IIb—IIb, IIc—IIc and IId—IId, respectively. Moreover, the land zone 16 is shown by a shadowed region in FIG. 1.

In order to prevent uneven wear, it is favorable that the central distance L1 between the first main groove 12a and the second main groove 12b located at the succeeding ground contact side 13 at the tread opening ends is equal to the central distance L2 between the first main groove 12a and the second main groove 12b located at the preceding ground contact side 14 at the tread opening ends. However, it is possible that both the central distances are made different when the pattern noise comes into problem.

In order to further improve the drainage property of the main groove and enhance the resistance to uneven wear and the steering stability through the uniformization of block rigidity, as shown in FIG. 1, the land portion 22 sandwiched between the first main groove 12a and the second main groove 12b located at the preceding ground contact side 14 is provided with three auxiliary grooves 9a–9c each communicating to these main grooves. The auxiliary grooves may be adequately arranged in accordance with the purpose of fire use.

Figure 3:
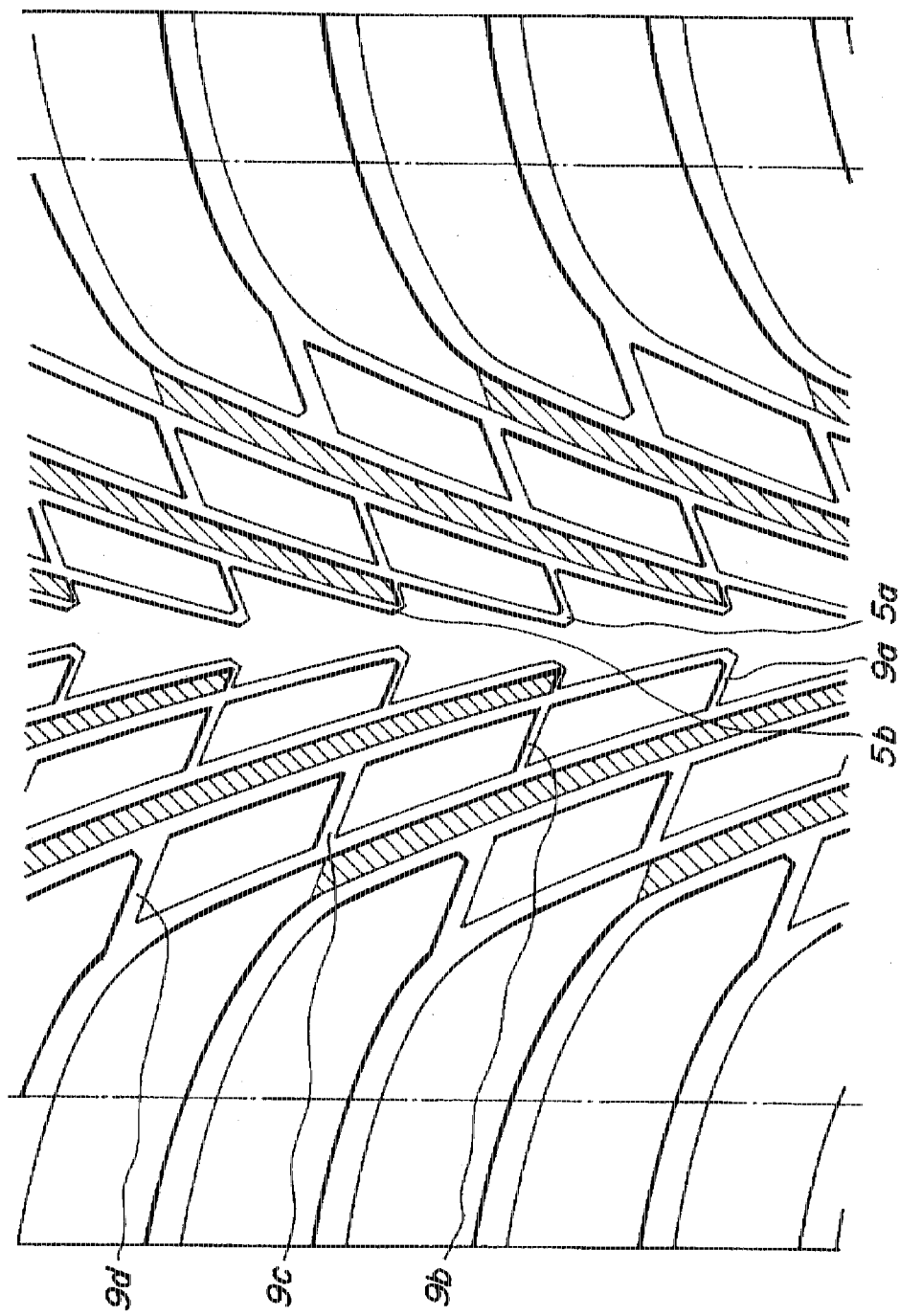
FIG. 3 is a diagrammatical view illustrating a part of a tread pattern in a pneumatic tire used in Example 2.
Figure 4:
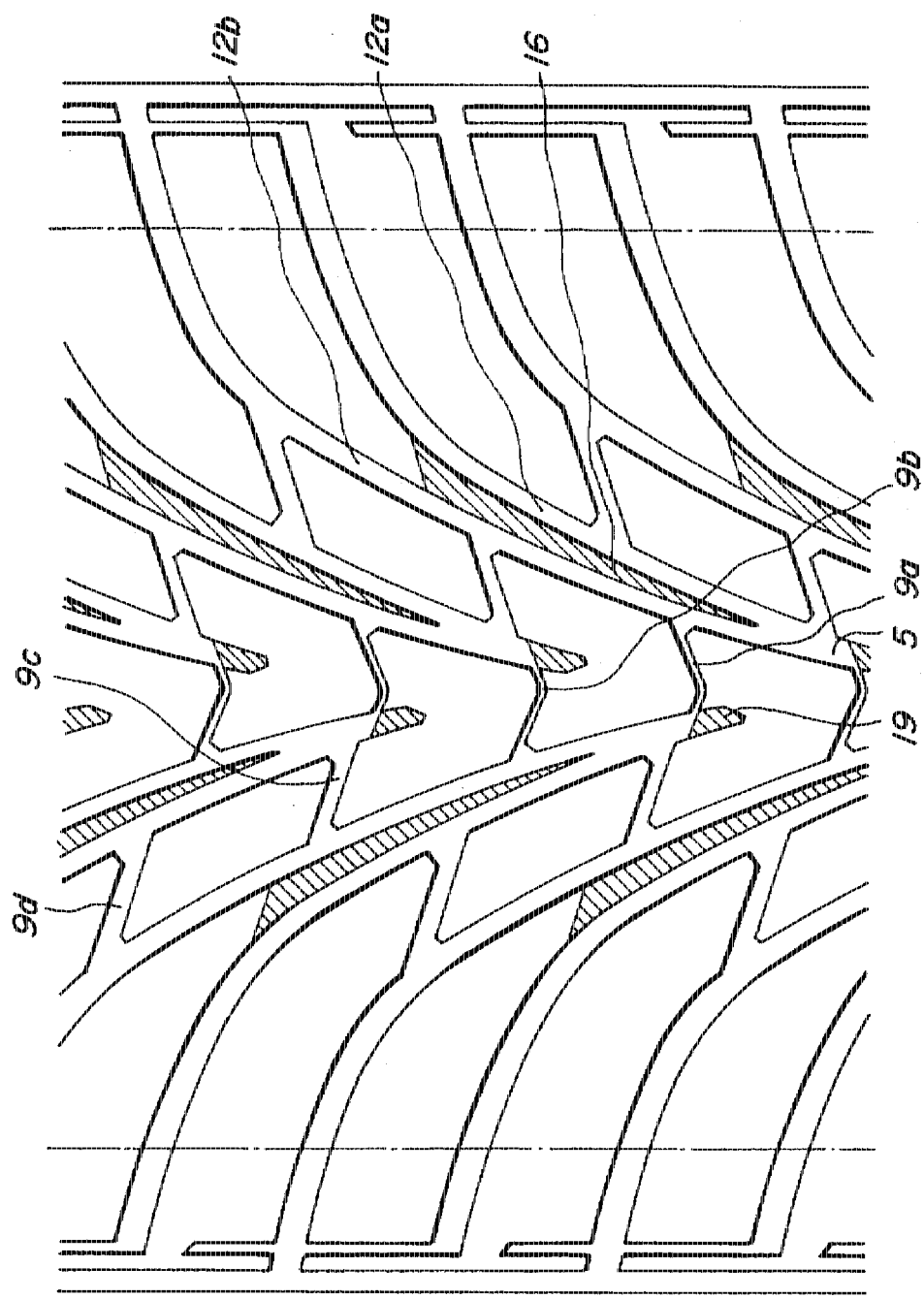
FIG. 4 is a diagrammatical view illustrating a part of a tread pattern in a pneumatic tire used in Example 3.

In FIG. 1, the first and second main grooves are arranged so as to substantially meet the positions of the end points 5a, 5b in the widthwise direction with each other. However, the positions of the end points 5a, 5b of the first and second main grooves 12a, 12b in the widthwise direction may be shifted from each other in the circumferential direction as shown in FIG. 3. Alternatively, the first and second main grooves 12a, 12b may be formed by bifurcating the main groove from a single end point 5 toward the tread end as shown in FIG. 4. Moreover, in order to balance the block rigidity in the central region of the tread and ensure the groove area, a zone of the land portion corresponding to an extended part 19 of the end point 5 is chamfered in a direction opposite to the chamfering direction in the land zone 16 sandwiched between the steep slope segments 6a, 6b in FIG. 4. However, the formation of such an extended part may be conducted, if necessary.

In the pneumatic tire according to the invention, the second main groove 12b is arranged at the succeeding ground contact side 13 with respect to the first main groove 12a in which the steep slope segment 6b and gentle slope segment 8b of the second main groove 12b are substantially in parallel with those 6a, 8a of the first main groove 12a. The land width of the zone 16 in the land portion 15 sandwiched between the steep slope segments 6a, 6b of the first and second main grooves 12a, 12b is made fairly narrower than that of the land zone 17 sandwiched between the gentle slope segments 8a, 8b or the steep slope segments 6a, 6b of the first main groove 12a and the second main groove 12b located at the succeeding ground contact side 13 are adjoined to each other, whereby the groove density per one pitch in the central region of the tread is made large to enhance the drainage efficiency.

On the other hand, the land width of the land zone 17 sandwiched between the gentle slope segments 8a, 8b is made wider, whereby sufficient rigidity can be ensured in the land zone 17 located at the side region of the tread.

Furthermore, the surface height of the land zone 16 sandwiched between the steep slope segments 6a, 6b is gradually decreased toward the pattern center, whereby a space volume produced by chamfering the land zone 16 sandwiched between the steep slope segments 6a, 6b is added to groove volumes of the steep slope segments 6a, 6b of the first and second main grooves 12a, 12b to make the groove volume in the central region of the tread large. The groove volume in the bending segments 7a, 7b of the main grooves 12a, 12b is made relatively small to increase the flow rate of water in these bending segments 7a, 7b, whereby the drainage efficiency sideward from the gentle slope segments 8a, 8b of the first and second main grooves 12a, 12b located at the side region of the tread can be more enhanced. Moreover, the groove volume, is gradually decreased from the steep slope segments 6a, 6b toward the bending segments 7a, 7b in the first and second main grooves 12a, 12b, so that the balance in the ratio of groove area to the land portion between the central region and the side region of the tread is not extremely lost and there is no fear of degrading the drainage property.

The following examples are given in illustration of the invention and are not intended as limitations thereof.

EXAMPLE 1

An invention tire 1 used in this example has a tread pattern shown in FIG. 1, a tire size of PSR 225/50R16 and a tread width TW of 200 mm, in which a plurality of first and second main grooves 12a, 12b extending from end points 5a, 5b located in the pattern center 1 or the vicinity thereof to open at a tread end 10 or 11 are arranged in each of tread portions 3, 4 formed by dividing the tread 2 at the pattern center 1. Each of the first and second main grooves 12a, 12b is comprised of a steep slope segment 6a, 6b having an inclination angle of 23° with respect to the circumferential line of the tire, a bending segment 7a, 7b extending at such a curvature that the inclination angle is gradually increased as compared with the steep slope segment 6a, 6b and a gentle slope segment 8a, 8b extending from the bending segment 7a, 7b to open at the tread end 10 or 11 and having an inclination angle of 73° with respect to the circumferential line of the tire. Moreover, the second main groove 12b is arranged at the succeeding ground contact side 13 with respect to the first main groove 12a in which the steep slope segment 6b and gentle slope segment 8b of the second main groove 12b are substantially in parallel with those 6a, 8a of the first main groove 12a.

The groove widths of the first and second main grooves 12a, 12b are gradually increased from 3.0 mm to 4.5 mm in the steep slope segments 6a, 6b toward the tread end, and 6.5 mm in the gentle slope segments 8a, 8b. The land width of the zone 16 of the land portion 15 sandwiched between the steep slope segments 6a, 6b of the first and second main grooves 12a, 12b is gradually increased from an end 20 located side the pattern center 1 from an end 21 located side the tread end, in which the land width is 3.0 mm at the end 20 and 4.5 mm at the end 21. On the other hand, the land width of the zone 17 sandwiched between the gentle slope segments 8a, 8b is 26 mm.

Furthermore, the circumferential length projected onto the circumferential line of the tire in the land zone 16 sandwiched between the steep slope segments 6a, 6b is 95 mm, which is 2.71 times the central distance between the tread opening end 18a and 18b of the first and second main grooves 12a and 12b (35 mm). On the other hand, the land zone 16 sandwiched between the steep slope segments 6a, 6b is chamfered at an angle of 23° with respect to the surface of the land portion to gradually decrease the surface height of the land zone toward the pattern center 1, in which the most decreased position of the surface height in the land zone 16 is met with the bottom of the first main groove 12a.

Also the central distance (35 mm) between the tread opening ends of the first main groove 12a and the second main groove 12b located at the succeeding ground contact side 13 is made equal to the central distance between the tread opening ends of the first main groove 12a and the second main groove 12b located at the preceding ground contact side 14.

Moreover, the land portion 22 sandwiched between the first main groove 12a and the second main groove 12b located at the succeeding ground contact side 14 is provided with two auxiliary grooves 9b and 9c communicating with these main grooves 12a, 12b at an inclination angle of 70° with respect to the circumferential line of the tire (groove width of the auxiliary groove 9c located toward the tread end: 4.5 mm, groove width of the auxiliary groove 9b located toward the pattern center: 3.0 mm) and an auxiliary groove 9a communicating the second main groove 12b to an end of another second main groove located in another tread portion (groove width: 2.0 mm). In this case, the end points 5a, 5b of the first and second main grooves 12a and 12b are positioned substantially at the same level in the widthwise direction of the tire.

The construction of the tire other than the tread is the same as used in the usual tire.

EXAMPLE 2

An invention tire 2 used in this example has a tread pattern shown in FIG. 3 and substantially the same construction as in Example 1 except for the followings.

The inclination angle with respect to the circumferential line of the tire is 18°–19° in the steep slope segments 6a, 6b of the first and second main grooves 12a, 12b, while the groove width of the main groove is gradually increased from 2.0 mm to 4.5 mm toward the tread end. Furthermore, the gentle slope segments 8a, 8b have an inclination angle of 68° and a groove width of 6.5 mm. Moreover, the land width of the land zone 16 is gradually increased from the end 20 toward the end 21 in which the land width is 2.5 mm at the end 20 and 4.0 mm at the end 21, while the land width of the land zone 17 is 26.5 mm. In addition, four auxiliary grooves 9a–9d communicating with these main grooves are arranged in the land portion 22 at an inclination angle of 68° with respect to the circumferential line of the tire, in which the groove widths of these auxiliary grooves 9a–9d are 1.5 mm, 2.3 mm, 3.5 mm and 4.0 mm, respectively. Also the end points 5a and 5b of the first and second main grooves are shifted from each other by a half pitch in the circumferential direction of the tire. Moreover, the land zone 16 is chamfered at an angle of 18° with respect to the surface of the land portion so as to gradually decrease the surface height of the land zone toward the pattern center 1, in which the most decreased position of the surface height in the land zone 16 is met with the bottom of the first main groove.

EXAMPLE 3

An invention tire 3 used in this example has a tread pattern shown in FIG. 4 and substantially the same construction as in Example 1 except for the following differences.

The steep slope segment 6a of the first main groove 12a has an inclination angle of 28° with respect to the circumferential line of the tire and a groove width of gradually increasing from 3.5 mm to 5.5 mm toward the tread end, while the gentle slope segment 8a has an inclination angle of 73° and a groove width of gradually increasing from 5.5 mm to 6.5 mm toward the tread end. The steep slope segment 6b of the second main groove 12b has an inclination angle of 25° and a groove width gradually increasing from 3.5 mm to 5.5 mm toward the tread end. The gentle slope segment 8b has an inclination angle of 73° and a groove width of gradually increasing from 5.5 mm to 6.5 mm toward the tread end.

The land width of the land zone 16 is gradually increased from the end 20 toward the end 21 in which the land width is 1.0 mm at the end 20 and 8.5 mm at the end 21, while the land width of the land zone 17 is 26 mm. In addition, four auxiliary grooves 9a–9d communicating with these main grooves are arranged in the land portion 22 at an inclination angle of 70°–72° with respect to the circumferential line of the tire, in which the groove widths of these auxiliary grooves 9a–9d are 1.5 mm, 1.5 mm, 3.5 mm and 5.0 mm, respectively.

The land zone 16 is chamfered at an angle of 26° with respect to the surface of the land portion to gradually decrease the surface height of the land zone toward the pattern center 1, in which the most decreased position of the surface height in the land zone 16 is met with the bottom of the first main groove. Furthermore, the first and second main grooves are bifurcated from a single end point 5 toward the tread end, while the extended part 19 of the end point 5 is formed by chamfering the land portion in a direction opposite to the chamfering direction of the land zone 16 sandwiched between the steep slope segments 6a, 6b.

Conventional Example

Figure 5:
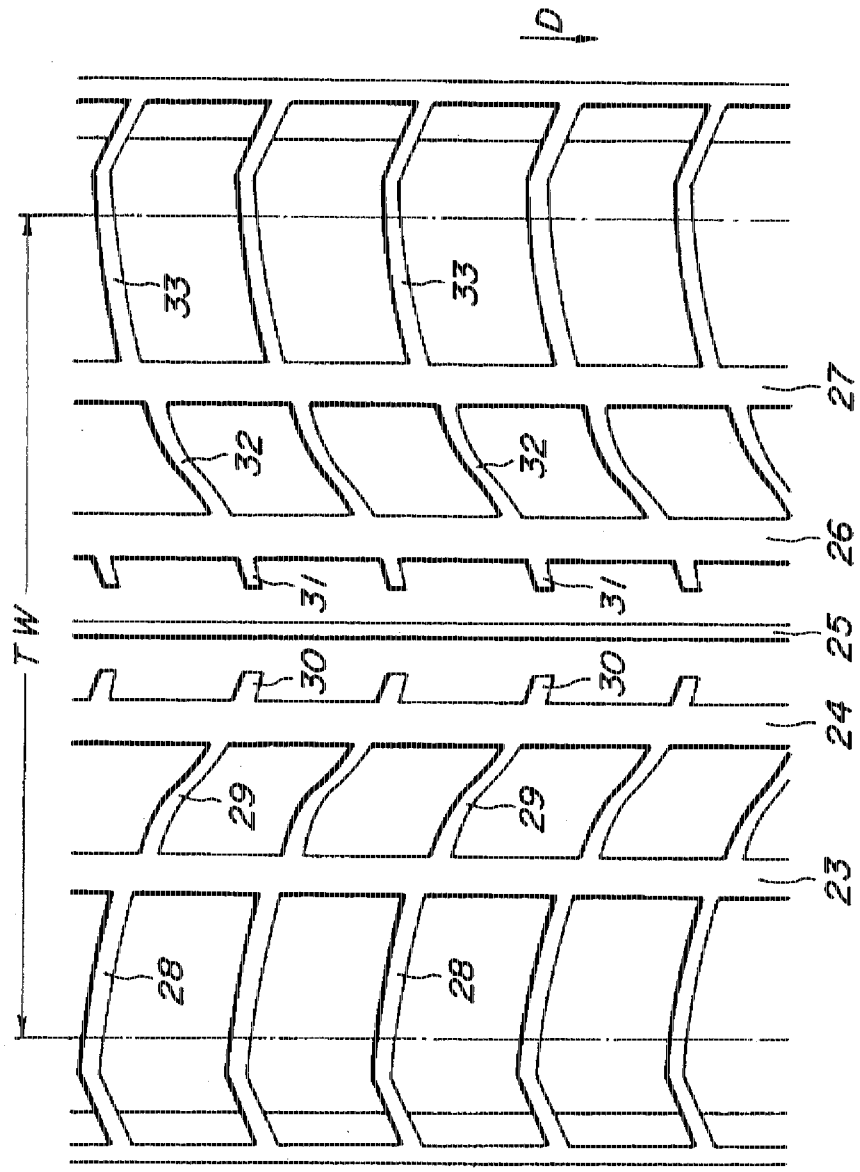
FIG. 5 is a diagrammatical view illustrating a part of a tread pattern in a pneumatic tire used in the conventional example.

A tire used in this example is a pneumatic tire having the conventional tread pattern shown in FIG. 5, in which five circumferential grooves and a plurality of directional slant grooves are arranged in the tread. This tire has a tire size of 225/50R16 and a tread width TW of about 200 mm.

In the above tread pattern, a circumferential groove 25 disposed in a center of the tread has a groove width of 4 mm, and a pair of circumferential grooves 24, 26 having a groove width of 11 mm are arranged at both sides of the circumferential groove 25, and a pair of circumferential grooves 23, 27 having a groove width of 10 mm are arranged at a position corresponding to about ¼ of the tread width from the tread end toward the tread center. These four wide circumferential grooves 23, 24, 26, 27 and many slant grooves 28, 29, 30, 31, 32, 33 contribute to the drainage property on wet road surface.

Test Method

Each of these tires is subjected to an internal pressure of 2.5 kgf/cm$^2$ and tested under a load corresponding to a single passenger weight to evaluate the drainage property and steering stability.

The drainage property is evaluated by hydroplaining on wet road surface during the straight running and the cornering.

Concerning the hydroplaining in straight running, the hydroplaining speed produced when the vehicle is straightforward run on wet road surface having a water depth of 5 mm is measured by feeling of a test driver.

Concerning hydroplaining in cornering, when the vehicle is run on a wet circuit course having a radius of curvature of 80 m and a water depth of 5 mm, limit lateral G is measured by feeling of a test driver together with a hydroplaining speed produced.

The steering stability is evaluated by the feel of a test driver when the vehicle is run on a circuit course at dry state under various sport running modes.

The thus evaluated results are shown in Table 1. Moreover, the result is represented by an index value on the basis that the conventional example is 100, in which the larger the index value, the better the property.

TABLE 1

|  | Conventional Example | Example 1 | Example 2 | Example 3 |
|---|---|---|---|---|
| Hydroplaining in straight running | 100 | 115 | 120 | 120 |
| Hydroplaining in cornering | 100 | 120 | 120 | 125 |
| Steering stability | 100 | 100 | 95 | 100 |

As seen from the results of Table 1, the tires of Examples 1–3 are excellent in the drainage property as compared with the conventional tire. Furthermore, the steering stability in Examples 1–3 is approximately equal to that of the conventional tire.

As mentioned above, in the pneumatic tire according to the invention, the region sandwiched between the steep slope segments of the first and second main grooves is constructed with a land zone having a space volume contributing to the drainage, whereby the drainage property can be enhanced while controlling the lowering of the rigidity in the land zone as compared with the conventional tire having the usual land zone without chamfering.

Therefore, the invention can provide pneumatic tires having improved drainage property and steering stability.

What is claimed is:

1. A pneumatic tire comprising; a tread divided into two tread parts at a center of a tread pattern, and a plurality of main grooves arranged in each of these tread parts, each of said main grooves comprised of a steep slope segment extending from a position in the center of the tread pattern or the vicinity thereof at a relatively small inclination angle with respect to a circumferential line of the tire, a bending segment extending from the steep slope segment at such a curvature that the inclination angle is gradually increased and, a gentle slope segment extending from the bending segment to open at an end of the tread and having a relatively large inclination angle with respect to the circumferential line, and said main grooves gradually entering into a ground contact region starting from the position of the center of the tread pattern or the vicinity thereof and progressing toward the end of the tread, wherein the main grooves comprise a group of first main grooves and a group of second main grooves, and the first and second main grooves being arranged to alternate in a ground contact area, and the steep slope segment and gentle slope segment of the second main groove are substantially in parallel with corresponding steep slope and gentle slope of the first main groove, and a zone of a land portion sandwiched between the steep slope segments of the first and second main grooves is fairly narrow in land width measured in a direction perpendicular to the first main groove compared with a zone of the land portion sandwiched between the gentle slope segments of the first and second main grooves, said zone provided in an alternating manner between said first and second main grooves on each of said tread parts, and a surface height of the zone of the land portion sandwiched between the steep slope segments is gradually decreased from an end of the zone to the center of the tread pattern wherein, said end of said zone is adjacent the bending segment of the first main groove.

2. A pneumatic tire according to claim 1, wherein the inclination angle of each of the first and second main grooves is within a range of 0°–40° in the steep slope segment, and within a range of 50°–90° in the gentle slope segment.

3. A pneumatic tire according to claim 1, wherein the land width of the zone of the land portion sandwiched between the steep slope segments of the first and second main grooves is 0.03–0.50 times of the land width of the zone of the land portion sandwiched between the gentle slope segments of the first and second main grooves and within a range of 0.3–2.5 times the groove width of the first main groove.

4. A pneumatic tire according to claim 1, wherein a circumferential length of the zone of the land portion sandwiched between the steep slope segments of the first and second main grooves and projected onto the circumferential line of the tire is within a range of 1–5 times a central distance between opening ends of the first and second main grooves at the tread end.

5. A pneumatic tire according to claim 1, wherein the surface height of the zone of the land portion sandwiched between the steep slope segments of the first and second main grooves is substantially flush at its lowest height with a bottom wall of the first main groove.

6. A pneumatic tire according to claim 1, wherein the central distance between opening ends of the first and second main grooves is approximately equal to a central distance between opening ends of the first main groove and a preceding second main groove.

7. A pneumatic tire according to claim 1, wherein the zone of the land portion sandwiched between the first main groove and a preceding second main groove is provided with a plurality of auxiliary grooves each communicating to the first and second main grooves.

8. A pneumatic tire according to claim 7 further comprising said auxiliary grooves each extending laterally and connecting to said first and second main grooves at staggered circumferential positions.

9. A pneumatic tire according to claim 1 wherein a land width of a land zone sandwiched between gentle slope segments of said main grooves is within a range of 15–40 mm.

* * * * *